(12) United States Patent
Kitamura et al.

(10) Patent No.: US 7,079,191 B1
(45) Date of Patent: Jul. 18, 2006

(54) DIGITAL BROADCAST RECEPTION APPARATUS AND PICTURE PRINTING METHOD

(75) Inventors: Yoshio Kitamura, Kanagawa (JP); Makoto Niioka, Kanagawa (JP); Yuji Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 09/630,872

(22) Filed: Aug. 2, 2000

(30) Foreign Application Priority Data

Aug. 3, 1999 (JP) ............................. 11-220281

(51) Int. Cl.
*H04N 7/00* (2006.01)

(52) U.S. Cl. ............... 348/552; 348/553; 358/1.1; 358/1.15

(58) Field of Classification Search ................ 348/552, 348/553, 563, 460, 461, 468, 207.2; 725/133, 725/141, 151, 153; 358/1.1, 1.16, 1.17, 1.15
See application file for complete search history.

(56) References Cited

U.S. PATENT DOCUMENTS

| | | | | |
|---|---|---|---|---|
| 4,251,691 A | * | 2/1981 | Kakihara et al. | 348/14.01 |
| 5,287,181 A | * | 2/1994 | Holman | 348/473 |
| 5,561,709 A | * | 10/1996 | Remillard | 379/93.19 |
| 5,604,542 A | * | 2/1997 | Dedrick | 348/552 |
| 5,715,315 A | * | 2/1998 | Handelman | 380/234 |
| 5,905,529 A | * | 5/1999 | Inuiya et al. | 348/221.1 |
| 6,111,613 A | * | 8/2000 | Sasano et al. | 348/468 |
| 6,144,362 A | * | 11/2000 | Kawai | 345/629 |
| 6,337,712 B1 | * | 1/2002 | Shiota et al. | 348/231.1 |
| 6,366,359 B1 | * | 4/2002 | Garland | 358/1.15 |
| 6,774,951 B1 | * | 8/2004 | Narushima | 348/552 |
| 6,987,540 B1 | * | 1/2006 | Narushima et al. | 348/552 |

* cited by examiner

*Primary Examiner*—David Ometz
*Assistant Examiner*—Jean W. Désir
(74) *Attorney, Agent, or Firm*—Frommer Lawrence & Haug LLP; William S. Frommer

(57) ABSTRACT

A frame memory for extending data of an picture demonstrated on an picture display device is effectively utilized to effect the printing of an picture demonstrated on the picture display device inexpensively and appropriately. To this end, there is provided a printing data creating unit 26 for acquiring data of the picture demonstrated on a display monitor 30 from a frame memory 22 which holds the data from frame to frame. The printing data creating unit 26 prepares data for printing based on the so-acquired data.

7 Claims, 6 Drawing Sheets

DIGITAL BROADCAST RECEPTION APPARATUS AND PICTURE PRINTING METHOD

BACKGROUND OF THE INVENTION

1. Field of the Invention

This invention relates to a digital broadcast reception apparatus for receiving digital broadcast for preparing data for printing, and a picture printing method for printing a picture for demonstration on a picture display device.

2. Description of Related Art

In printing a picture demonstrated on a display monitor of a television receiver, there is known a method employing an analog video printer.

In this method, the analog video printer is supplied, from the television receiver, with the analog picture signals corresponding to a picture demonstrated on a display monitor of the television receiver. The analog picture signals, supplied to the analog video printer, are digitized and sequentially written in a frame memory within the analog video printer, in terms of a frame of the picture demonstrated on the display monitor as a unit.

If a user issues a command for printing a picture demonstrated on the display monitor, the frame memory of the analog video printer ceases to be updated to determine a picture to be printed. From the frame memory, data of the picture to be printed is read out and converted into data for printing. The analog video printer executes printing based on these printing data. This causes printing of the picture demonstrated on the display monitor of the television receiver.

Recently, digital television broadcast, in which television broadcast is executed by digital signals, was launched, and the television broadcast in its entirety is predicted to be executed in future by digital signals.

In a digital television receiver, receiving digital television broadcast, received digital picture signals are sequentially written in a frame memory of the digital television receiver in terms of a frame of the picture demonstrated on the display monitor as a unit. Based on the digital picture signals, extended on the frame memory, data for monitor display is prepared, in keeping with the demonstrating mode on the display monitor, such as interlacing mode or progressive mode, so that a picture id demonstrated on the display monitor.

If, in a digital television receiver receiving the digital television broadcast, described above, a picture demonstrated on the display monitor is to be printed, it may be contemplated to provide a page memory for printing in the digital television receiver, in addition to the frame memory used for extending data of a picture demonstrated on the display monitor, to write received digital picture signals sequentially in this page memory for printing. If a printing command is issued by the user, the data is taken out from the page memory for printing and converted into printing data suited for the printer, so as to be then transmitted to the printer through an interface, such as a centronics cable, in order to effect the printing.

However, with this method, the page memory for printing is required in addition to the frame memory in which to extend data of a picture to be demonstrated on the display monitor, thus increasing the cost.

SUMMARY OF THE INVENTION

It is therefore an object of the present invention to provide a digital broadcast receiving apparatus having a frame memory for storing data of a picture demonstrated on a picture display device, such as a digital television receiver, in which, by effectively utilizing this frame memory, a picture demonstrated on the picture display device can be printed inexpensively and appropriately.

It is another object of the present invention to provide a picture printing method in which a picture demonstrated on a picture display device can be printed inexpensively and appropriately.

In one aspect, the present invention provides a digital broadcast reception device including reception means for receiving digital broadcasting, storage means for storing picture data of digital broadcasting, received by the reception means, in terms of a frame of an picture demonstrated on an picture display device s a unit, and printing data creating means for acquiring the picture data stored in the storage means for preparing data for printing based on the picture data.

In this digital broadcast reception device, digital broadcast is received by the reception means, and picture data of the digital broadcast, as received by this reception means, is stored in the storage means from one frame of the picture demonstrated on the picture display device to another.

If a command for printing an picture demonstrated on the picture display device is issued by a user, the printing data creating means acquires picture data stored in the storage means to prepare data for printing based on the picture data.

The data for printing, prepared by the printing data creating means, is routed to the printing means, which is connected to the printing data creating means over an internal bus. The printing means prints a picture demonstrated on the picture display device based on the printing data prepared by the printing data creating means.

In the digital broadcast reception device of the present invention, in which the printing data creating means acquires picture data of digital broadcast from storage means, adapted for storing a picture demonstrated on the picture display device, from one frame of the picture to another, and data for printing is prepared based on the image data, there is no necessity of additionally providing a page memory for preparing the data for printing.

So, with the present digital broadcast reception device, the image demonstrated on a picture display device can be printed inexpensively and appropriately.

Moreover, if, in this digital broadcast reception device, the printing means for printing a picture demonstrated on the picture display device is connected to the printing data creating means over an internal bus, the data for printing can be transmitted speedily to the printing means.

In another aspect, the present invention provides an picture printing method including storing received digital broadcast picture data in terms of a frame of an picture demonstrated on an picture display device s a unit, acquiring the picture data stored in the storage means to prepare data for printing based on this picture data and printing an picture for demonstration on the picture display device based on the data for printing.

In this picture printing method, in which digital broadcast image data is acquired from storage means, configured for storing the image data from one frame of the picture demonstrated on the picture display device to another, and data for printing is acquired on the basis of the so-acquired picture data, it is unnecessary to additionally provide a page memory for preparing the data for printing.

Therefore, in the present picture printing method, the picture demonstrated on the picture display device can be printed inexpensively and appropriately.

Moreover, in the digital broadcast reception device of the present invention, in which, if a command for printing a picture demonstrated on the image display device is issued by the user, the printing data creating means acquires picture data from storage means adapted for storing image data in terms of a frame of the picture demonstrated on the picture display device, as a unit, and prepares the data for printing on the basis of the so-acquired picture data, it is unnecessary to provide another page memory for preparing the data for printing. Therefore, in the present digital broadcast reception device, the picture demonstrated on the picture display device can be printed inexpensively and appropriately.

In addition, in the picture printing method of the present invention, in which, if a command for printing a picture demonstrated on the image display device is issued by the user, picture data are acquired from storage means adapted for storing image data in terms of a frame of the picture demonstrated on the picture display device, as a unit, and the data for printing are prepared on the basis of the so-acquired picture data, it is unnecessary to provide another page memory for preparing the data for printing. Therefore, in the present picture printing method, the picture demonstrated on the picture display device can be printed inexpensively and appropriately.

DESCRIPTION OF THE PREFERRED EMBODIMENTS

Figure 1:
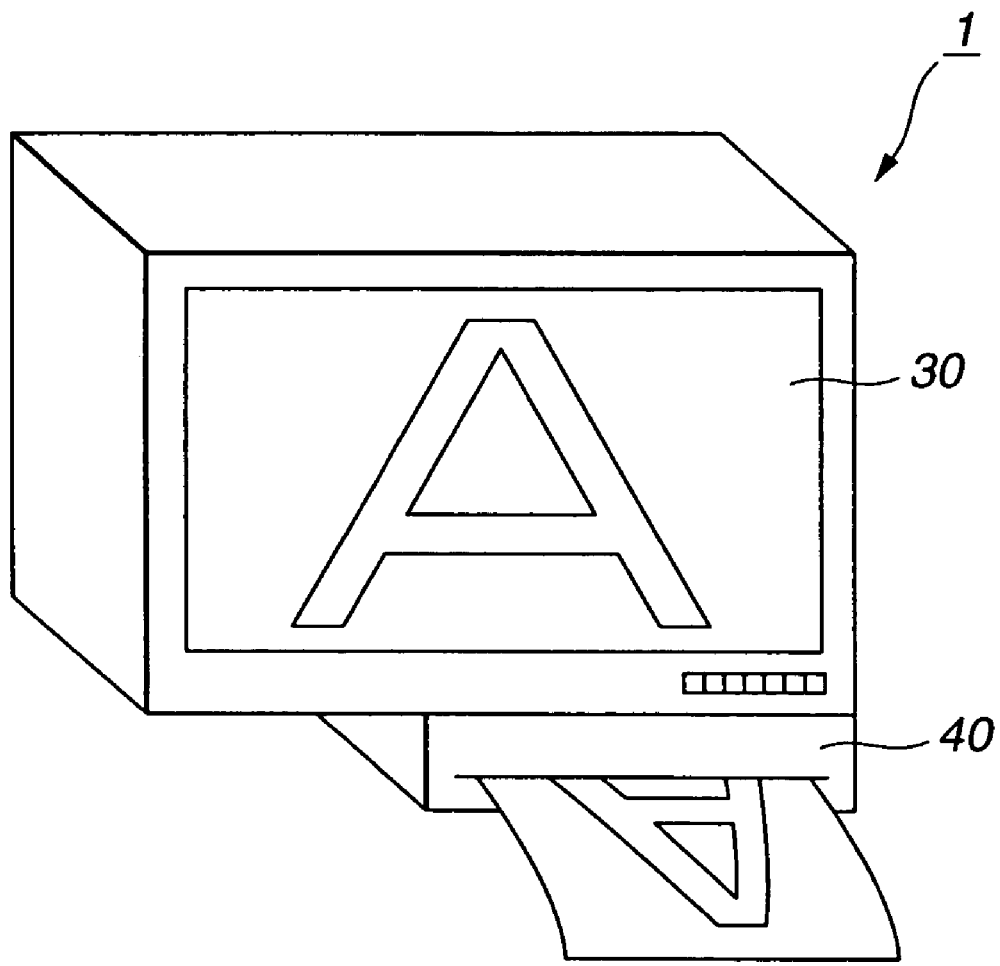
FIG. 1 is a schematic perspective view showing the overall appearance of a digital television printer according to the present invention.

Referring to the drawings, preferred embodiments of according to the present invention will be explained in detail.

FIG. 1 shows an overall appearance of a digital television printer embodying the present invention. The digital television printer 1, shown in FIG. 1, includes a digital broadcast reception device according to the present invention, a display monitor 30, as a picture display device, and a printer 40 as printing means, these components together making up a sole apparatus.

Figure 2:
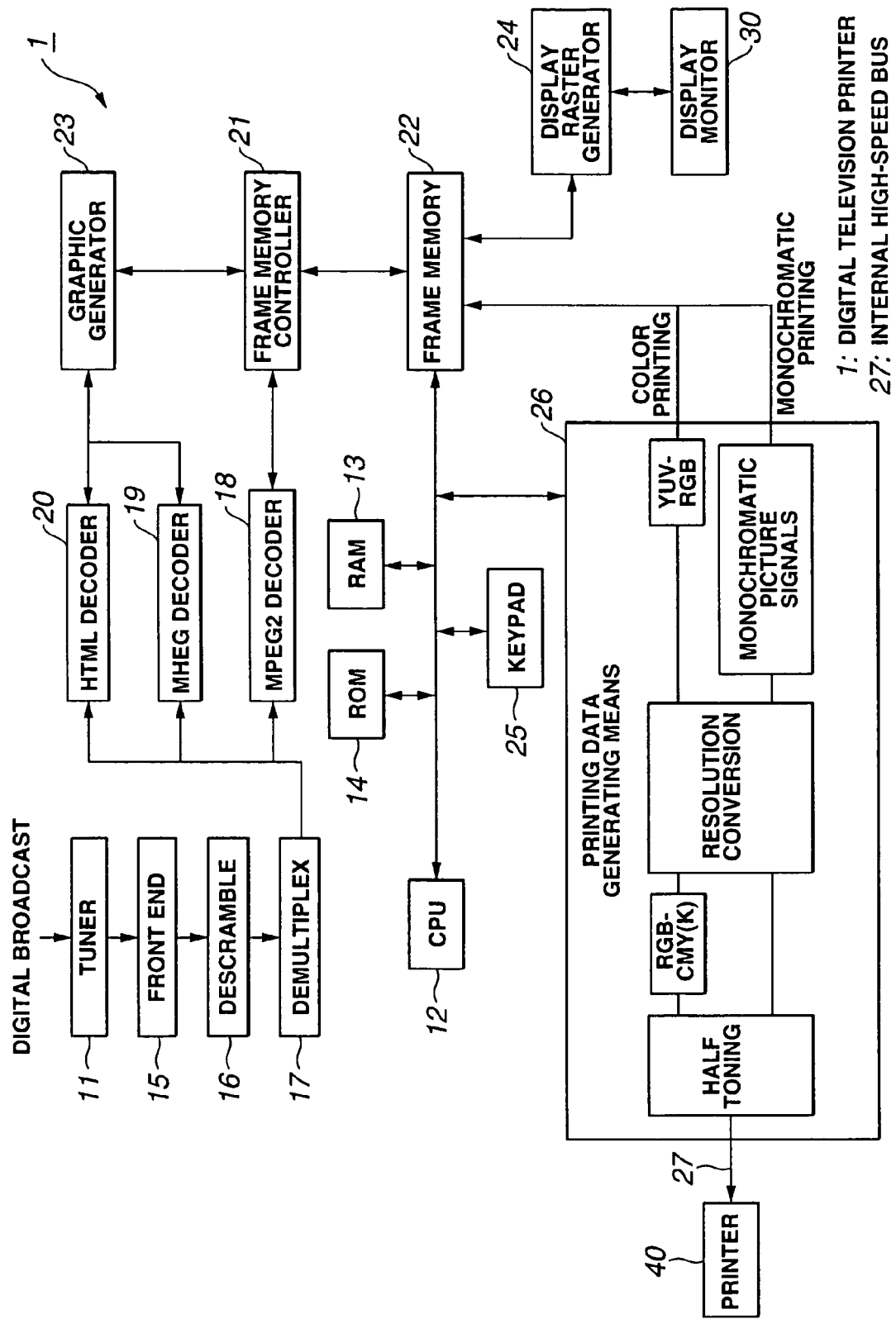
FIG. 2 is a block diagram showing an internal structure of the digital television printer.
Figure 3:
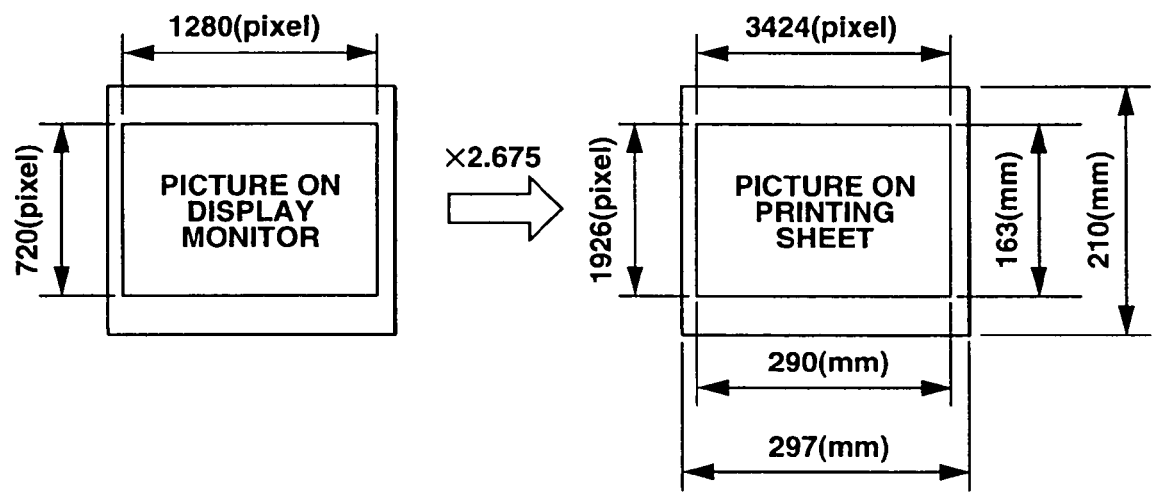
FIG. 3 shows the relation between a picture demonstrated on a display monitor and a picture printed on a printing sheet of a printer.

FIG. 2 shows a block diagram showing the internal structure of the digital television printer 1.

The transmitting station combines moving picture data or still picture data, created by a broadcasting station, a service provider or a contents provider, into a hybrid signal, which is sent out as a ground wave or a cable signal. If necessary, the transmitting station scrambles the hybrid signal to prohibit a party other than a subscribed from reading out the information.

The hybrid signal, transmitted from the transmitting station, is received through an antenna, a cable modem and so on, by a tuner 11 of the digital broadcast reception device. At this time, a CPU 12 of the digital broadcast reception device exploits a RAM 13 as a work area to execute the program stored in the ROM 14 to manage control such as channel selection.

The hybrid signal, received by the tuner 11, is separated by a front-end unit 15 into a baseband wave, and descrambled by a descrambling unit 16. The descrambled hybrid signal is separated by a demultiplexer 17 into variable data, such as the moving picture data or still picture data, created by the broadcasting station, service provider or the contents provider.

The variable data, separated by the demultiplexer 17, are inputted to separate decoders, associated with the respective data, for decoding. Specifically, the MPEG2 data, as the moving picture data for a broadcasting station, are routed to an MPEG2 decoder 18 for decoding, whilst the MPEG data, received as still picture data for broadcasting, are routed to an MPEG decoder 19 for decoding, and HTML data, mainly used in a WWW home page, is inputted to an HTML decoder 20, similarly for decoding.

The MPEG2 data, decoded by the MPEG2 decoder 18, is written in a frame memory 22, under control by a frame memory controller 21. The MPEG data, decoded by the MPEG decoder 19, and the HTML data, decoded by the HTML decoder 20, are written in the frame memory 22, under control by the frame memory controller 21, following the preparation of a raster size of the letter information and that of the picture information by a graphic generator 23.

In the frame memory 22, the above variable data are written from one frame of a picture demonstrated on a display monitor 30 to another. That is, the frame memory 22 transiently holds data making up a frame of a picture demonstrated on the display monitor 30 (picture data).

The picture data written in the frame memory 22 is read out by a display raster generator 24. The display raster generator 24 formulates display data, in keeping with the display mode (interlacing or progressive mode) on the display monitor 30 to route the display data to the display monitor 30. This demonstrates a picture on the display monitor 30.

If a command by a user for printing a picture demonstrated on the display monitor 30, that is picture data present in the frame memory 22, is inputted from a printing command input mechanism, such as a keypad 25 of the digital broadcast reception device, the CPU 12 utilizes the RAM 13 as a work area to execute the program stored in the ROM 14 to start the printing operation.

Specifically, the CPU 12 is perpetually monitoring the state of the printing command inputting equipment, such as a keypad 25 and, if the CPU verifies that a printing command has been issued by the user, the CPU 12 first controls the writing operation of the frame memory controller 21 so that no new data will be written in the frame memory 22 until printing comes to a close. The purpose of doing this is to prevent picture data from being rewritten during printing to effect proper printing in case the time needed until completion of printing of picture data in the frame memory 22 is longer than the time needed in updating picture data for one frame in the frame memory 22 to demonstrate a new picture plane in the display monitor 30.

The CPU 12 then requests a printing data creating unit 26 to acquire picture data from the frame memory 22 to create data for printing based on this picture data.

For monochromatic printing, the printing data creating unit 26 extracts a luminance signal Y from picture data constituted by YUV signals, made up of the luminance signal Y and color difference signals U and V, to use the extracted signal as monochromatic picture signals. In order to facilitate picture processing by the printer 40, it is possible for the printing data creating unit 26 to convert the YUV signal into RGB signal to use the luminance signal Y as found from the RGB signal by the following equation:

$$Y=0.2126R+0.7152G+0.0722B$$

as monochromatic picture signals.

The printing data creating unit 26 then converts the resolution of picture data, prepared for demonstration on the display monitor, to provide the resolution matched to the picture for printing by the printer 40. For example, if the printer 40 is capable of printing at 300 dpi and the picture data is data demonstrating a picture at 730 p: 1280 (H)×720 (V), according to one of the standards for digital TV broadcasting, a picture demonstrated on the display monitor 30 can be printed to an A4 size by the printer 40, by the printing data creating unit 26 effecting conversion of the picture data resolution to effect density conversion (enlargement) of the number of pixels of a raster by a factor 0 f 2.675.

Finally, the printing data creating unit 26 executes half-toning in keeping with the number of gradations that can be represented by the printer 40 to complete data for printing. The half-toning is the processing of data conversion of Y-signals, quantized in 256 gradations, by a organized dithering method or an error diffusion method, to enable pseudo-gradation to be represented in case a printer capable of representing only two gradations, such as a laser beam printer, is used as the printer 40.

For color printing, the printing data creating unit 26 first converts the YUV signals into RGB signals to provide for facilitated picture processing on the printer 40. After the picture data resolution conversion, as discussed above, the printing data creating unit 26 converts the YUV signals into CMY signals for coping with the cyan, magenta and yellow inks on the printer 40. Finally, the data for printing is prepared by the half-toning processing as discussed above.

The data for printing, thus prepared, is sequentially transmitted to the printer 40. This causes a picture demonstrated on the display monitor 30 to be printed by the printer 40.

In this digital television printer 1, the printer 40 is connected by a high-speed internal bus 27 to the printing data creating unit 26 of the digital broadcast reception device. The data for printing, prepared by this printing data creating unit 26, is transmitted to the printer 40 over this high-speed internal bus 27. So, the digital television printer 1 is able to transmit the data for printing at an elevated speed to the printer 40 to effect the printing speedily.

The printer 40 as printing means is now explained with reference to FIGS. 4 and 5. Here, a monochromatic laser printer, capable of achieving high-speed printing, is used as the printer 40, in order that the time during which the picture demonstrated on the display monitor 30 is paused during printing will be as short as possible. The present invention is, however, not limited to this embodiment since a printer operating under different printing methods, such as an ink jet printer, a thermally sensitive printer or a sublimation printer may also be used as the printer 40.

Figure 4:
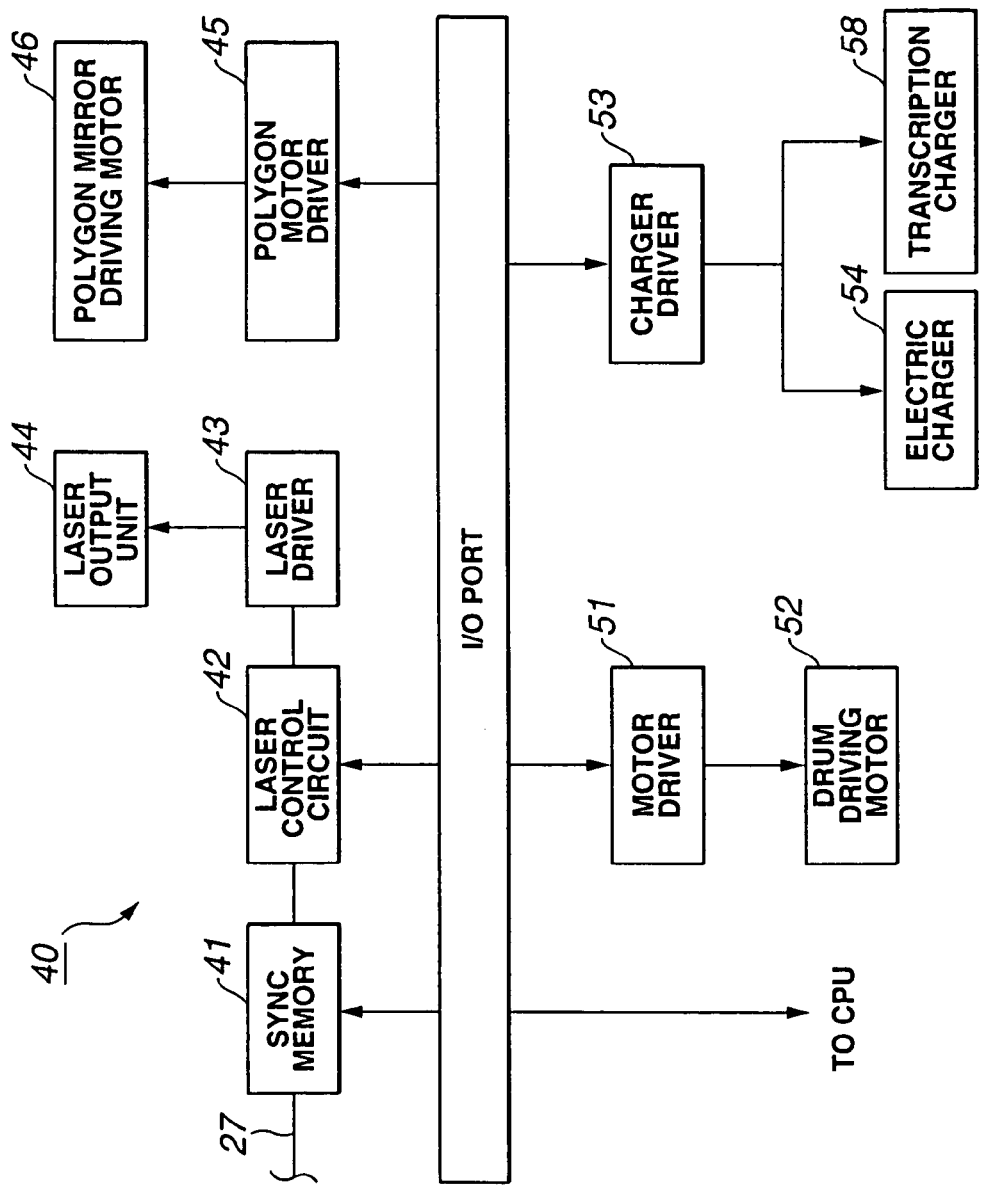
FIG. 4 is a block diagram showing a driving circuit of a printer provided on the digital television printer.
Figure 5:
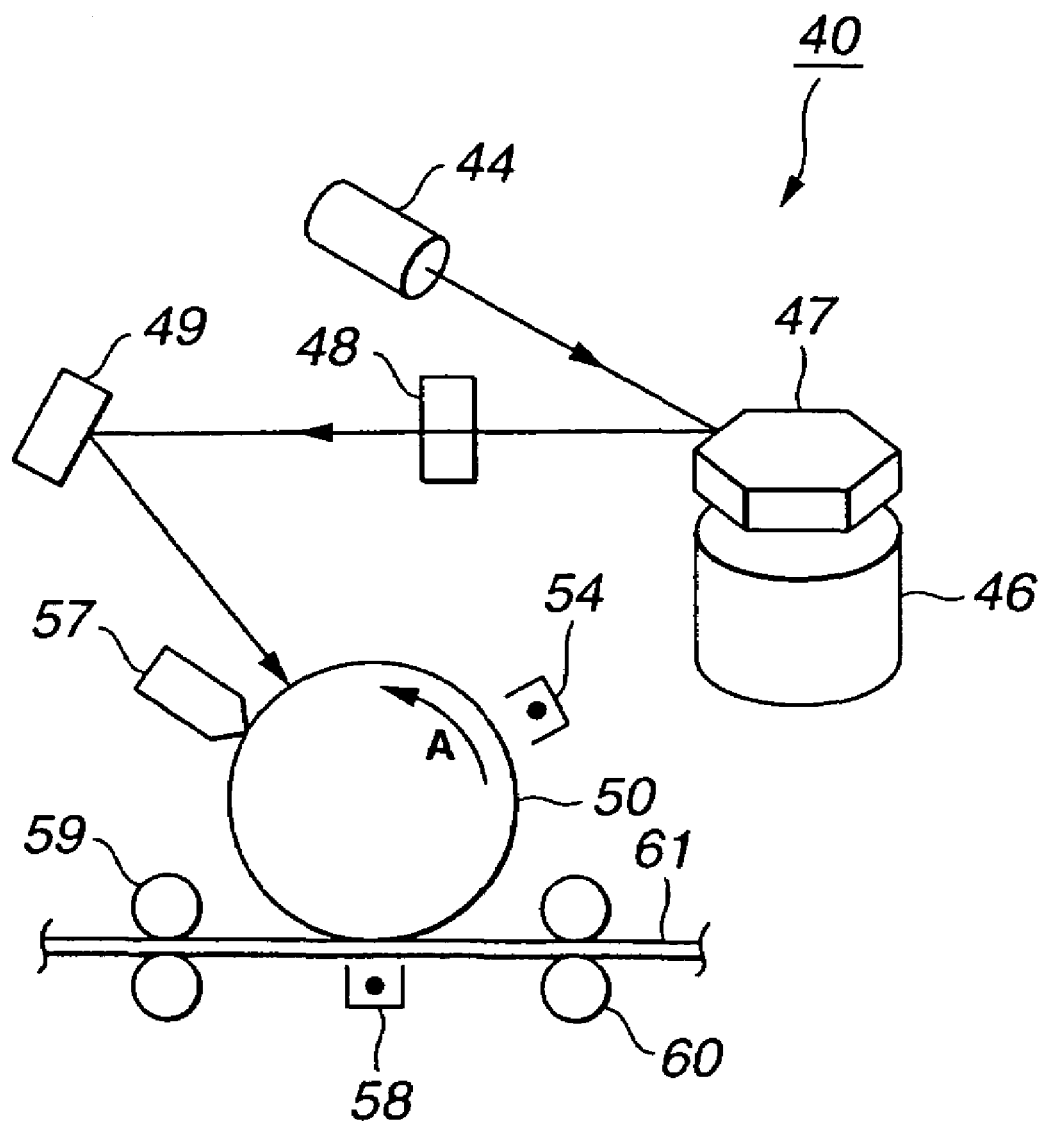
FIG. 5 is a schematic view showing a printing processing unit of the printer.

The printer 40 includes a driving circuit as shown in FIG. 4 and a printing processing unit as shown in FIG. 5.

The data for printing, transmitted to the printer 40 over the high-speed internal bus 27, is converted by a sync memory 41, a laser control circuit 42 and a laser driver 43 into a laser output signal which is sent to a laser output circuit 44. This causes the laser light corresponding to the laser output signal to be radiated by the laser output circuit 44.

The laser light outputted by the laser output circuit 44 is reflected by a reflecting surface of a polygonal mirror 47, rotationally driven by a polygonal mirror driving motor 46, controlled by a polygonal motor driver 45, to scan the peripheral surface of a photosensitive drum 50 linearly through a lens 48 and a reflective mirror 49.

The photosensitive drum 50 is rotationally driven in the direction indicated by arrow A in FIG. 5, with the laser light scanning direction as the rotational axis, by a drum driving motor 52, controlled by a motor driver 51.

The photosensitive drum 50 is electrically charged by an electronic charger 54, controlled by a charger driver 53, as the photosensitive drum 50 is run in rotation. By the peripheral surface of the electrically charged photosensitive drum 50 being scanned by the laser light, a latent picture corresponding to data for printing is formed on the peripheral surface of the photosensitive drum 50.

A toner is supplied from a developer 57 to a latent picture formed on the peripheral surface of the photosensitive drum 50 to form a toner picture. This toner image is moved with rotation of the photosensitive drum 50 and, when the toner picture is brought to a position facing a transcription charger 58, controlled by a charger driver 53, the toner picture is transcribed to printing sheet 61, transported from a sheet feed cassette, not shown, through transport rolls 59, 60. The printing sheet 61, onto which the toner picture has now been transcribed, is transported on a paper path, not shown, and is subjected to fixing by a fixing unit, not shown. The resulting printed sheet is conveyed out of the printer 40. This prints an picture demonstrated on the display monitor 30.

Figure 6:
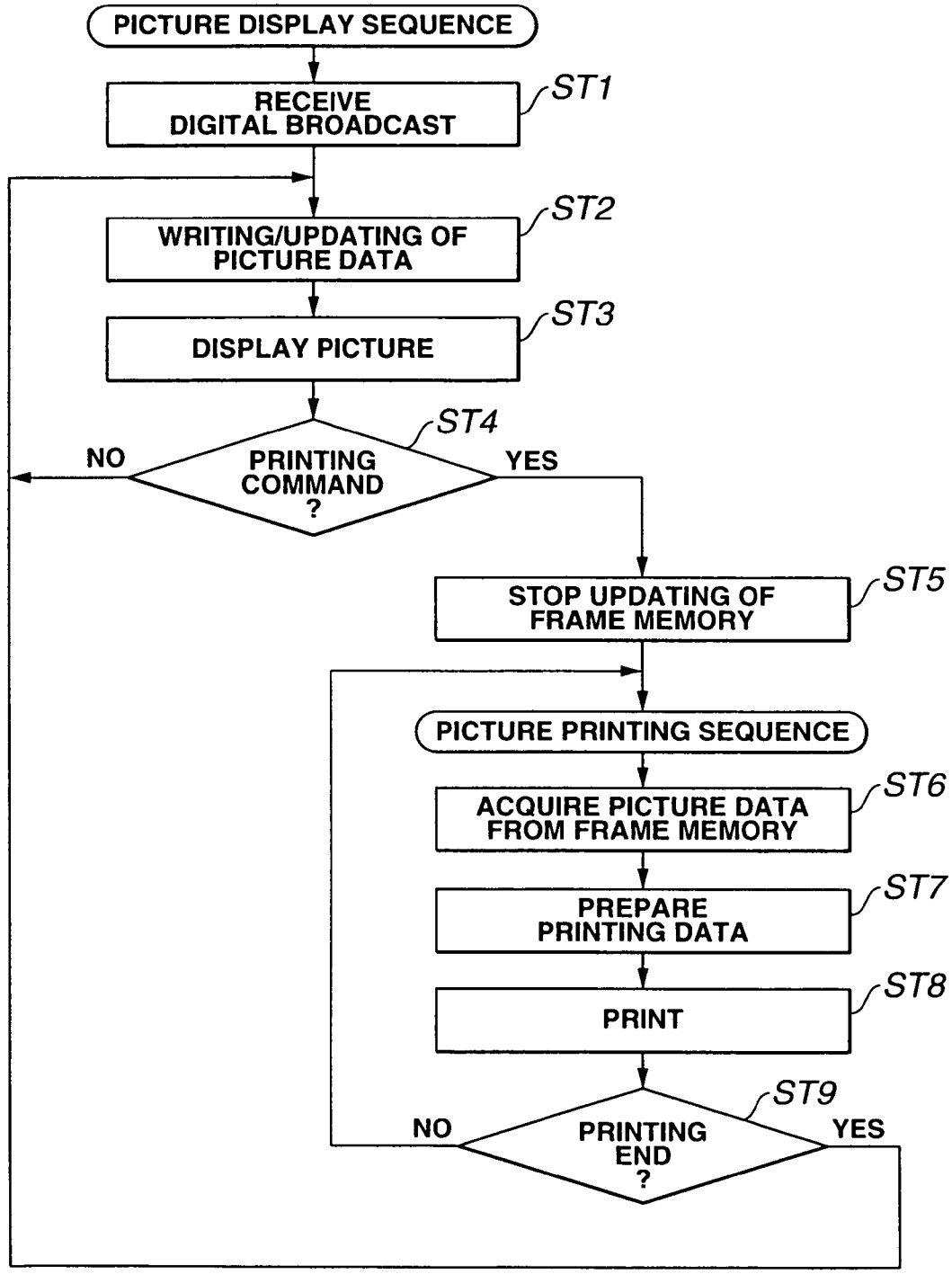
FIG. 6 is a flowchart for illustrating the operation of the digital television printer.

The operation of the digital television printer 1, embodying the present invention is now explained with reference to FIG. 6.

First, at step 1 of the picture display sequence, digital broadcast is received by a digital broadcast reception device. Then, at step 2, picture data of the received digital broadcast is written in the frame memory 22 of the digital broadcast reception device, from one frame of the picture demonstrated on the display monitor 30 to another. At step 3, the picture data in the frame memory 22 is transmitted to the display monitor 30 where the picture is demonstrated.

At step 4, it is checked by the CPU 12 whether or not a command by a user for printing a picture demonstrated on the display monitor 30 has been issued. If the CPU verifies that the command for printing the picture demonstrated on the display monitor 30 has not been issued, the CPU 12 reverts to step 2 to update the frame memory 22 to proceed to write the next picture data. If the CPU verifies that the command for printing the picture demonstrated on the display monitor 30 has been issued, the CPU 12 proceeds to stop the updating of the frame memory 22 to start the picture plane printing sequence.

In the picture plane printing sequence, the printing data creating unit 26 first acquires picture data at step 6 from the frame memory 22. Then, at step 7, the printing data creating unit 26 prepares data for printing, based on the picture data acquired from the frame memory 22.

Then, at step 8, the data for printing is transferred to the printer 40 where the picture demonstrated on the display monitor 30 is printed by the printer 40. Then, at step 9, the CPU 12 verifies whether or not the printing has come to a close. If it is verified that the printing has not come to a close, the printing sequence is continued. If it is verified that the printing has come to a close, the CPU reverts to step 2 to update the frame memory 22 to proceed to write the next picture data.

In the digital television printer 1 according to the present invention, as described above, in which, when a command for printing an picture demonstrated on the display monitor 30 is issued, the printing data creating unit 26 acquires picture data of an picture demonstrated on the display monitor 30 from the frame memory 22 to prepare data for printing based on these picture data to transmit the data for printing to the printer 40, which then prints the picture demonstrated on the display monitor 30, the picture demonstrated on the display monitor 30 can be printed appropriately and speedily despite its simplified structure.

In the foregoing description, the digital television printer 1 is made up of a digital broadcast reception device, a display monitor 30 and a printer 40, integrated together to a unitary structure. The present invention is, however, not limited to this structure and may be configured so that one or both of the display monitor 30 and the printer 40 is separated and connected over an external connection cable to the digital broadcast reception device.

What is claimed is:

1. A digital broadcast reception device comprising:
   reception means for receiving digital broadcasting;
   storage means for storing picture data of digital broadcasting, received by said reception means, in terms of a frame of a picture demonstrated on a picture display device;
   printing data creating means for acquiring the picture data stored in said storage means for preparing data for printing based on said picture data;
   printing command input means for receiving printing commands; and
   control means for controlling the writing operation in said storage means, wherein when said printing command input means receives a printing command to print a picture demonstrated on said picture display device, said control means causes no new picture data to be written to said storage means after said printing command input means receives said printing command until printing is complete.

2. The digital broadcast reception device according to claim 1, further comprising:
   printing means for printing a picture for demonstration on said picture display device, based on the data for printing prepared by said printing data creating means;
   said printing means being connected to said printing data creating means over an internal bus.

3. The digital broadcast reception device according to claim 2, wherein:
   when a picture demonstrated on said picture display device is printed by said printing means, next picture data will not be written in said storage means.

4. The digital broadcast reception device according to claim 2 wherein
   said printing data creating means effects resolution conversion on picture data acquired from said storage means depending on the demonstrating density of said picture display device and on the printing density of said printing means.

5. A picture printing method comprising:
   storing received digital broadcast picture data in terms of a frame of a picture demonstrated on a picture display device;
   receiving a printing command to print a picture demonstrated on said picture display device;
   preserving the stored picture data by not storing any new picture data after said printing command is received until printing is complete; and
   acquiring the stored picture data to prepare data for printing based on the acquired picture data; and
   printing a picture for demonstration on said picture display device based on said data for printing.

6. The picture printing method according to claim 5, wherein
   when a picture demonstrated on said picture display device is printed, next picture data will not be stored.

7. The picture printing method according to claim 5 wherein
   resolution conversion on said acquired picture data is performed depending on the demonstrating density of said picture display device and on the printing density in printing a picture demonstrated on the picture display device.

* * * * *